INVENTOR
Walter Kundler
BY
ATTORNEY

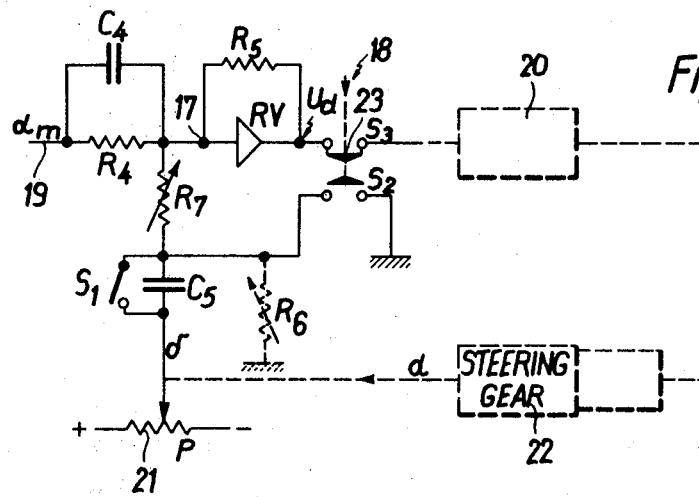
Fig. 4
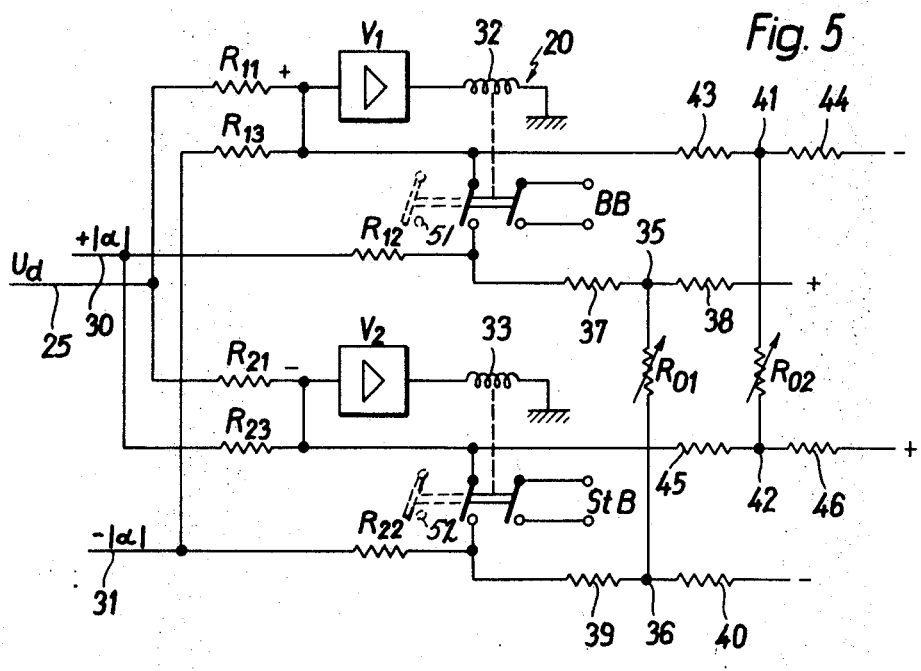
Fig. 5
Fig. 6
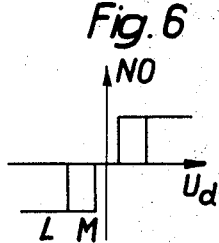
Fig. 7
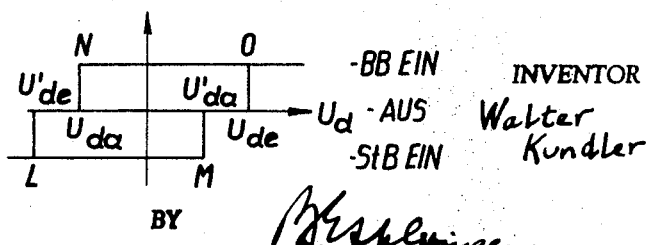

United States Patent Office 3,517,285
Patented June 23, 1970

3,517,285
ELECTRICAL AUTOMATIC PILOT FOR RUDDER-CONTROLLED VEHICLES, PARTICULARLY FOR SHIPS
Walter Kundler, Kronshagen, near Kiel, Germany, assignor to Anschütz & Co., G.m.b.H., Kiel-Wik, Germany, a limited-liability company organized under the German law
Filed Sept. 4, 1968, Ser. No. 757,276
Int. Cl. G05b 11/01
U.S. Cl. 318—18                          23 Claims

ABSTRACT OF THE DISCLOSURE

The novel electrical automatic pilot comprises means including a direction indicator, such as a compass, for producing an electrical signal representing the course error. This means is so connected by electrical connecting means with the controller of the steering gear as to cause the latter in response to any course error to actuate the rudder thereby reducing the course error to a minimum. The electrical connecting means include (a) elecrtical averaging means having a dead zone which permits the ship to perform yawing oscillations within certain limits without causing any rudder actuation, and (b) an operational circuit causing the controller to produce the actuation of the rudder through an instantaneous rudder angle which is composed of three components, the first one being proportional to the output of the averaging means, the second component being proportional to the integral of such output and the third component being proportional to the differential quotient of said output, and (c) a trigger circuit including means having a variable sensitivity and hysteresis and being controlled by the course error.

---

Figure 1:
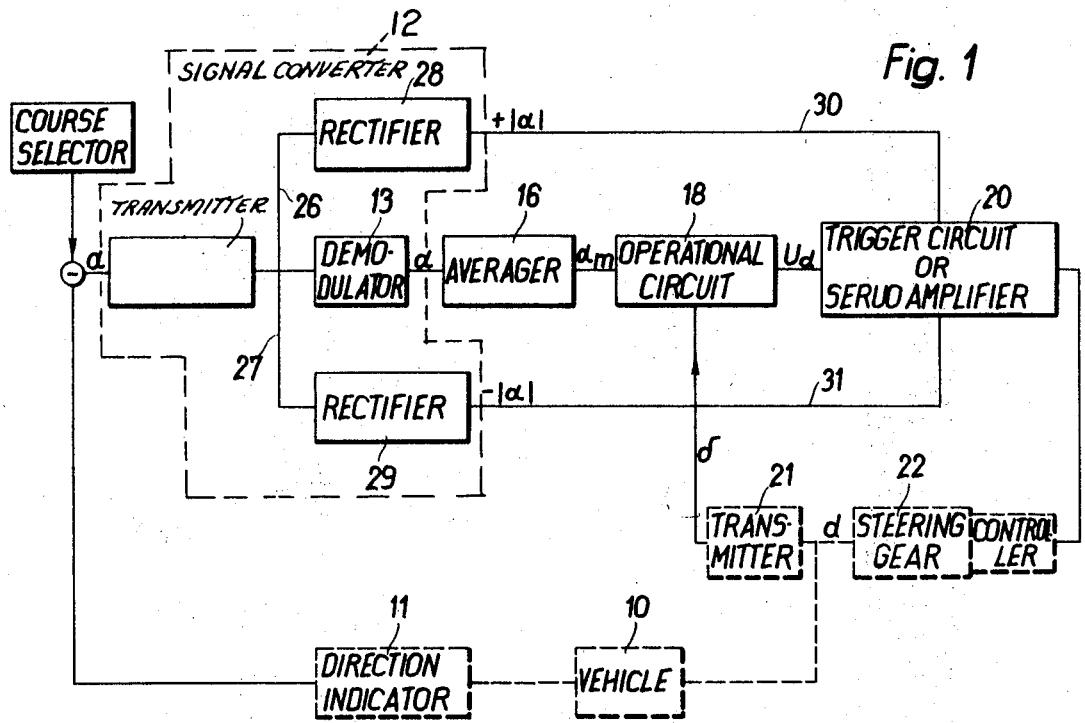

My invention relates to an electrical automatic pilot for rudder-controlled vehicles, particularly ships.

Automatic course-steering devices or automatic pilots associated with the compass are of such designs as to permit adjustments according to the changing requirements of the steering characteristics of a particular ship and to suit the prevailing weather conditions, as the amount of the rudder angle to be applied under existing conditions varies not only from ship to ship but depends upon her particular draught and trim. When subjected to wave motion the ship will be "yawning." This means that she will be thrown off her course by wave action and will thereafter return on her own accord to her original course.

The automatic pilot, when adjusted in such a way as to be too sensitive to deviations (course deviations) operates the steering gear whenever the ship tends ot yaw, whereby the steering gear is unduly strained. For that reason the automatic pilot should be made less sensitive during heavy weather.

In addition to rudder adjustment (rudder-angle-to-course-error ratio) and "yawing" adjustment further adjustment is required in order to obtain the amount of counter rudder necessary to prevent the ship from swinging past the correct course.

In the first designs of automatic pilots which enabled these adjustments to be made, steering switches starting and stopping the steering gear were controlled by contacts which were mechanically displaced by the compass card and by the steering gear through a feed-back control (see "Der Anschütz-Kreiselkompass"—"The Anschütz Gyrocompass" by H. Meldau).

These different adjustments permit improvements, allowance being made for certain typical factors. The improvement may, for example, relate to steady state control accuracy in a calm sea. To counter-act a given deviation, the automatic pilot adjusted accordingly produces a comparatively large rudder angle which is built up by small increments. The reduction of wear and tear on the steering gear may be another improvement, the requirement being that a minimum operations of the steering gear should suffice to control a disturbance (deviation) or to bring the ship on another course that has been selected beforehand. For this purpose, the rudder angle should be altered by large increments resulting in steady state oscillations with large amplitudes of the variables in the control system. These two contradictory requirements should be satisfied both for calm and rough seas.

During comparatively recent years electric automatic pilots for marine use have come into the market. They are equipped with a compass-controlled signal converter to produce a D.C. voltage which corresponds to the course error and electronically controls without using any contacts, the steering switches. An adjustable dead zone (dead band) is provided in these pilots. The present invention relates to an automatic pilot of this kind.

It is an object of my invention to provide an electric automatic pilot of this type for rudder-controlled vehicles, in particular ships, in which the above-mentioned contradictory aims are achieved without undue complexity in the design of the pilot, and to widen the range of operation of the autopilot to such an extent the adjustments need to be rarely, if ever, changed.

Further objects of my invention will appear from a detailed description of various embodiments of my invention with reference to the accompanying drawings. It is to be understood, however, that my invention is in no way restricted or limited to the details of such embodiments but is capable of numerous modifications within the scope of the appended claims.

Figure 2:
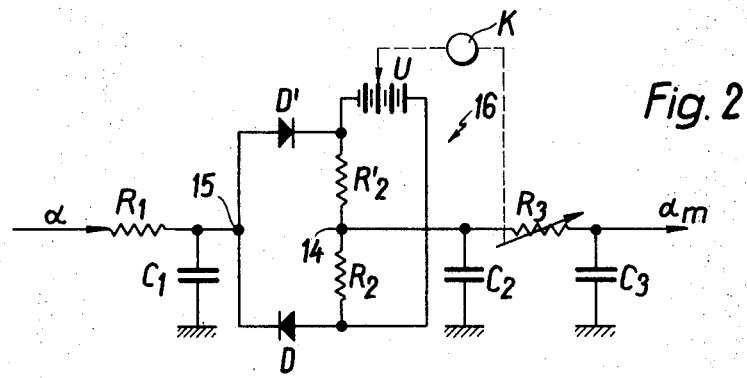
Figure 3:
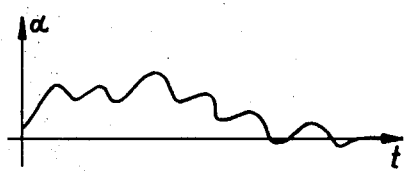
Figure 3:
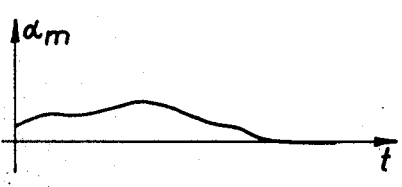
Figure 8:
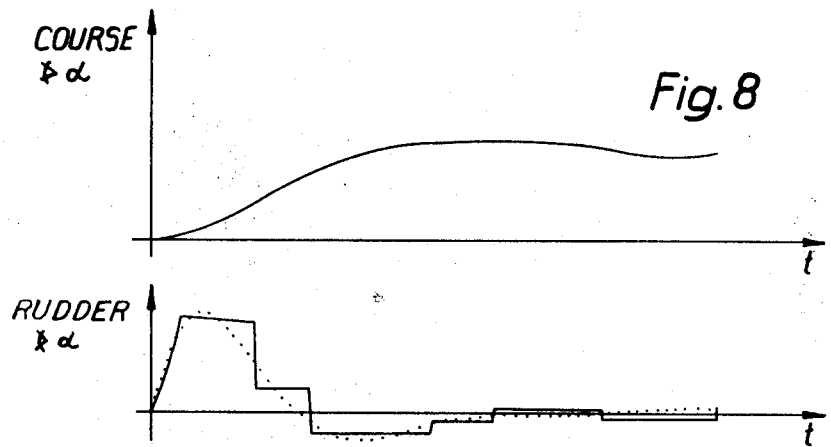
Figure 9:
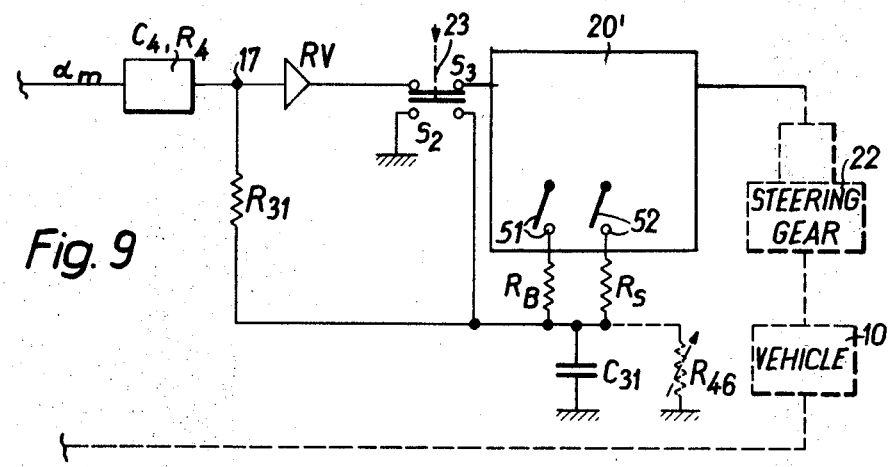
Figure 10:
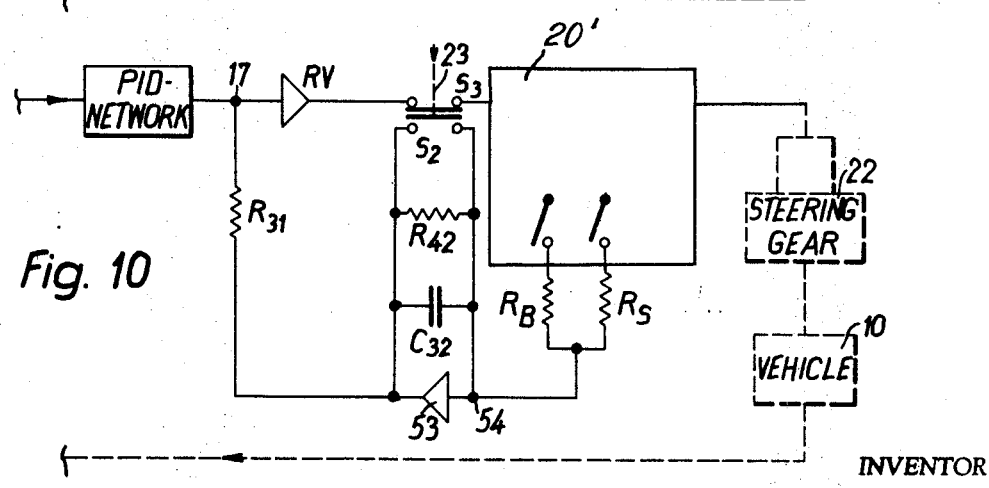
Figure 11:
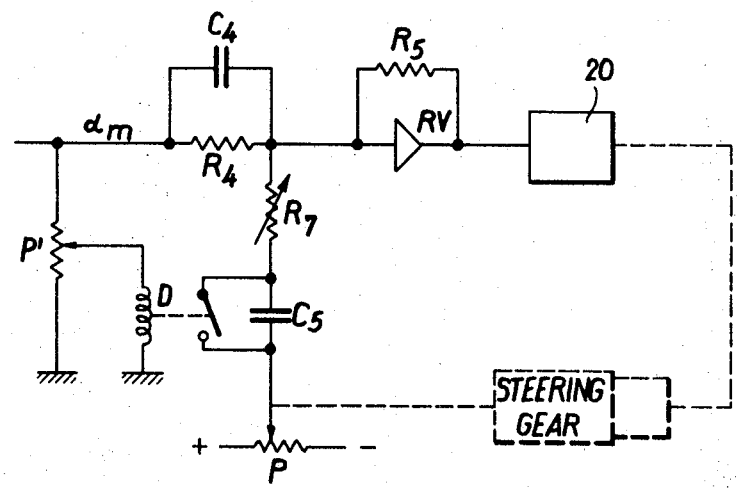

In the accompanying drawings, in which preferred embodiments of the present invention are illustrated by way of example only, FIG. 1 is a block diagram of an automatic pilot according to the invention, FIG. 2 shows the circuits of the averager, FIG. 3 shows two diagrams illustrating the principle of operation of the averager, FIG. 4 represents a circuit diagram of the operational circuit causing the instantaneous rudder angle to be composed of the three components referred to hereinbefore, FIG. 5 illustrates the trigger circuit operating the steering gear, FIGS. 6 and 7 are diagrams of the three operative states and of the four switch points of the trigger circuit operating the steering gear at different stages of operation, FIG. 8 represents two diagrams illustrating the principle of operation of the automatic electric pilot according to the invention, FIG. 9 shows an alternative embodiment having a circuit simulating the steering gear, FIG. 10 illustrates a modification of FIG. 9 and FIG. 11 a modification of FIG. 4.

The rudder-controlled vehicle 10 of FIG. 1 is equipped with a direction indicating means, e.g., a gyro compass 11, which in a known manner moves a course-selector that is capable of being controlled manually. The positional disagreement of the course-selector and the direction indicator corresponds to the deviation or course error $a$. In order to represent this deviation as an electrical signal the output voltage of a transmitter connected with the direction indicator and with the course selector varies with the selected course and the actual course. In the present embodiment the input of said transmitter which is either a potentiometer or a resolver is connected to an A.C. power supply. Its output, therefore, represents an A.C. voltage, the amplitude and phase of this voltage being dependent upon the magnitude and sign of the deviation.

Connected to the output of the transmitter is the input of a demodulator 13, whose output is a D.C. voltage $\alpha$ corresponding in magnitude and sign to the deviation, i.e., the deviation from the selected course. The output of the demodulator 13 is connected to the input of an averager 16 which enables a dead zone to be introduced, the range of said zone being adjustable at will. The limits of said zone can be altered by the peaks of the signal voltage $\alpha$ applied to the input of the averager in a manner similar to mechanical backlash. The mean value $\alpha_m$ between said limits is representative of the output of said averager.

FIG. 2 shows an embodiment of the averager 16. It consists of a voltage divider $R_2$ and $R'_2$, the central tapping point 14 of which connects to a grounded capacitor $C_2$ representing the output of said averager. The input 15 of said averager is connected via one rectifying diode D, D' each to the ends of the voltage divider $R_2$, $R'_2$. An adjustable voltage source U is inserted between said ends. A low-pass filter comprising a resistor $R_1$ and a grounded capacitor $C_1$ is connected before the averager, whereas another low-pass filter consisting of a resistor $R_3$ and a grounded capacitor $C_3$ is series-connected to said averager. Under certain conditions, however, one of these two low-pass filters might be dispensed with.

To illustrate the principle of operation, let U be at +2 volts and the voltage at 15 be +1.1 volts. Then a voltage of +1.1 volts exists at the cathode of the diode D' and another of −0.9 volt at the anode of the diode D. As a result, the average voltage at 14 is +0.1 volt. There will be no voltage change so long as $\alpha$ varies between +1.1 volts and −0.9 volt. In this example the 2-volt range represents a dead zone. It can be changed by changing U. Assume the vehicle to deviate from the course in such manner that the voltage at 15 is −1.2 volts. Then the voltage at the anode of D is, via the diode D, reduced to −1.2 volts, the voltage at the cathode of D' dropping to +0.8 volt via the voltage source U. As a result, the value of $\alpha_m$ at the output 14 changes to −0.2 volt. The voltage source U requires adjusting to allow for the ship's particular yaw. This averager offers an advantage over conventional arrangements provided for arbitrary adjustment of the dead zone of enabling the course error, due to yawing to be obtained as the arithmetical mean value even when a constant or very slightly varying course deviation is superimposed, for example, upon a sinusoidal yawing motion. This is an advantage because the course error signal averaged in this way can still be differentiated satisfactorily, the helm orders being much less frequently issued.

The yawing period is often equal to or even longer than that of the control system, particularly, for example, with a swell catching a ship from abaft. With the above-described arrangement, a reduction of helm orders is also possible under these conditions without a substantial loss of derivative action and hence of stability of control. On the other hand, matching by means of a low-pass filter would necessitate a low-pass time constant of such magnitude that the derivative action would be rendered almost ineffective. The averager ensures that with violent fluctuations of the course-error signal due to wave motion the mean value of $\alpha_m$ is built up by the positive and negative peak values of $\alpha$ with compatively little delay and remains unchanged until such time as the ship's yaw is normal, that means that $\alpha$ ranges within the limits of the dead zone. The low-pass filter $R_1$, $C_1$ inserted before the average or the series-connected one ($R_3$, $C_3$) or both of them ensure that only very small components that vary quickly and result from wave action are contained in the signal $\alpha_m$.

Preferably, the operation is simplified in that both the voltage source U and low-pass resistor $R_3$ can be controlled simultaneously by means of one control knob only, which is diagrammatically shown in FIG. 2 at K.

The use of the averager according to the invention offers an advantage in that the operational circuit 18 to be described later enables, even with yawing motion due to wave action, a control voltage which contains a component proportional to the derivative of the input signal $\alpha_m$ to be fed into the input of the trigger circuit operating the steering gear. Without this kind of averager 16 described excessive activity of the steering gear would result from a rapid change of $\alpha$ due to the ship's yaw.

Connected to the output of the average 16 is the input of an operational circuit 18 controlling the relays of the steering gear in such manner that the instantaneous rudder angle $d$ is made up of three components, namely, firstly, of a component proportional to the input signal (input variable) $\alpha_m$; secondly, of one that is proportional to the integral of the input signal (input variable) $\alpha_m$ and, thirdly, of one that is proportional to the derivative of the input signal (input variable) $\alpha_m$. The operational circuit 18 is, therefore, provided as a PID-network 18, the circuitry of which is shown in FIG. 4.

Connected to the input 19 are a resistor $R_4$ and a capacitor $C_4$ parallelled with said resistor. Both are connected to the summing junction 17 of an operational amplifier RV, whose feed-back circuit consists, in known manner, of a resistor $R_5$. At the output of the operational amplifier arises a voltage $U_d$ which is dependent upon both $\alpha_m$ and the derivative of $\alpha_m$ because the circuit elements $R_4$ and $C_4$ bring about, as is known, derivative action and proportional action between the input signal $\alpha_m$ and the output signal $U_d$, if the resistor $R_5$ represents the feedback circuit of the operational amplifier.

The I-component, i.e., the component that is proportional to the integral of $\alpha_m$ might be produced in known manner by a Miller integrator, an additional operational amplifier being required. To simplify the circuitry, however, a second operational amplifier is preferably dispensed with, for the I-component is produced by the feed-back of signals brought about behind the input of the trigger circuit 20 controlling the steering gear. To this end, the rudder supplies a feed-back signal which is decoupled by a capacitor $C_5$ inserted into the feed-back path and which charges up and discharges at a very slow rate via a resistor $R_7$. In the embodiment of the instant invention shown in FIG. 4 the feed-back signal is generated by a sensor 21 or transmitter which is coupled to the rudder and connected to the capacitor $C_5$. 21 may be a potentiometer inserted between the positive and negative leads of a D.C. source, the wiper of said potentiometer being capable of being displaced by the steering engine 22 simultaneously with the rudder. The capacitor $C_5$ is connected, via the resistor $R_7$, to the summing junction 17 of the operational amplifier RV. As soon as the rudder assumes its mid-position $\delta$ will be zero.

If a permanent rudder angle to one side, for example, to port is required for keeping a vehicle on a straight course which is identical with the set value of the course, the wiper of the potentiometer will correspondingly depart from its mid-position and $\delta$ will be, for example, a certain positive voltage, the voltage $U_d$ and the course-error signal $\alpha_m$ being at the same time zero. This is achieved by means of the capacitor $C_5$.

Thus, the I-component which enables this effect to be produced is obtained by the D.C. taken from the sensor 21 to the operational amplifier RV by utilizing galvanic decoupling. For this a Miller integrator or a similar integrating network is not required. Moreover, the circuitry described offers an advantage over other types of automatic pilots in that the I-component of the rudder angle which builds up very slowly can be set quickly as conditions demand. To this end, a switch 23 of the push-button type requires to be actuated which, by its normally-closed contacts $S_3$, then enables the output of the operational amplifier RV to be disconnected from the trigger circuit 20, and, by its normally-open contacts S₂, enables the terminals of the capacitor C₅ at the amplifier end to be grounded. C₅ instantaneously charges up to the voltage that is delivered by the sensor 21. At this instant, the correct rudder angle previously produced by a course error $\alpha_m$ is correlated to integral action.

After pressing, the push-button switch 23 requires releasing. This causes the ship's head to be brought to the set course and, hence, the error signal $\alpha_m$ to become zero.

To ensure that the I-component is capable of being adjusted without varying the value of the resistor R₇ or that of the capacitor C₅, a variable resistor R₆ may be inserted between the terminal of the capacitor C₅ at the amplifier end and ground.

It is possible to switch off the I-component. To this end, the switch S₁ must be closed, the capacitor C₅ being shorted. As soon as the course error exceeds, for example, a definite amount of 10°, it is also possible for the switch S₁ to close automatically. This serves the purpose of eliminating the detrimental effect of integration with long-duration course alterations, i.e., large ones of say, 90° until the course error has decreased to less than said amount of 10°. In place of the switch S₁ of FIG. 11 there may also be employed a relay D, contact making being caused automatically as soon as the course error exceeds a definite amount of, say, 10° that can be set by means of the potentiometer P'. By this, with long-duration, i.e., large course alterations, temporary elimination of integration is ensured until such time as the course error has decreased to 10° again. Otherwise integration would cause the vehicle to swing past the set course by a considerable amount.

Integral action of the circuit described can be proved mathematically by the following equation:

$$F'Ud,d = \frac{1}{p}$$

where $F'Ud,d$ is the frequency response from the voltage U_d to the rudder angle $d$ and $p$ the Laplacian operator. This set-up is applicable provided constant factors are neglected and the integral action is very slow relative to the period of the control system.

Ignoring, for the sake of simplicity, the derivative action ($C_4=0$) the open-loop frequency response from $\alpha_m$ to $d$ is $$F'\alpha_{m,d} = a \cdot \frac{1}{p}; \quad a = \frac{R_5}{R_4}$$

The corresponding open-loop frequency response from $\delta$ to $d$ is $$F'_{\delta,d} = b \cdot \frac{T \cdot p}{1+T \cdot p} \cdot \frac{1}{p}; \quad b = \frac{R_5}{R_7}; \quad T = \frac{R_7 R_6}{R_7 + R_6} \cdot C_5$$

According to the laws of control engineering the closed-loop frequency response from $\alpha_m$ to $d$ is $$F\alpha_m, d = \frac{a \cdot \frac{1}{p}}{1 + b \cdot \frac{T \cdot p}{1+T \cdot p} \cdot \frac{1}{p}}$$

This equation written in the following form shows that the control system is characterized by proportional action and integral action:

$$F\alpha_m, d = \frac{a \cdot b \cdot T^2}{(1+b \cdot T)^2} \cdot \frac{1}{1 + \frac{T}{1+bT} \cdot p} + \frac{a}{1+bT} \cdot \frac{1}{p}$$

With fast-acting gears, $a$ and $b$ are of a very high order of magnitude. The time constant T of the integration is also chosen as one of a high order of magnitude. Hence, $$\frac{a \cdot b \cdot T^2}{(1+b \cdot T)^2} \approx \frac{a}{b}, \text{ since } b \cdot T \gg 1$$

The time constant of time delay of the P-component $$\frac{T}{1+bT}$$

decreases under the existing conditions to negligible proportions.

The factor of the I-component is under the same conditions $$\frac{a}{b \cdot T}$$

the proportional control factor correlated to the P-component $a/b$ and represents the rudder-angle-to-course-error ratio corresponding to it. This ratio can be suited to the steering qualities of the vehicle by changing the amount of resistance in R₇.

Admittedly, change of the P-component will result in the I-component being changed, too. Should this cause inconvenience it is possible to make a simultaneous corresponding correction of the I-component by changing the P-component, for example, by an appropriate change of the amount of resistance in R₆.

The function of the push-button switch 23 described hereinbefore and the quick setting of the I-component it enables to be achieved is dealt with in detail hereinafter:

When the vehicle is on a straight course and the controller has, not yet produced by integral action the permanent rudder angle that is required to compensate for a permanent disturbing moment, a course error will result at first, the signal $\alpha_m$ of which brings about the compensating rudder application so that the vehicle is kept on its straight course.

When the push-button switch 23 is operated, as mentioned hereinabove, the capacitor C₅ will, owing to the low resistance of the potentiometer 21, charge up very quickly to that voltage which corresponds to the permanent rudder angle. After releasing switch 23, the permanent course error which had been caused, as described hereinbefore, will no longer be required to bring about a rudder position with a compensating effect, the error being quickly eliminated by the controller.

By the method of averaging by means of 16 and of generating PID-action in the network 18 the accurate set value of the rudder angle is present at any instant and varies only rather slowly if yawing occurs. Said set value is not represented by a single correlated analogous voltage, but by a combination of voltagese at several points of the network.

To achieve proportional plus integral plus derivative action control by using, according to the present invention, the course-error signal and feed-back signal, only one operational amplifier is required when summing junction enables all the necessary summations to be carried out. This entails a substantial saving of components as compared with known arrangements.

Furthermore, the circuits of the PID-component according to the invention make it possible for the output voltage swing of the operational amplifier to be dcreased to such an extent that the threshold voltages of the series-connected trigger can be exceeded. This has the additional advantage of the output voltage swing not having to be adapted to the diverse course-error amplitudes and frequencies occurring during the control operations, with the result that less stringent requirements are imposed on the operational amplifier.

Because of these facts and to attain the object of optimization that resides in the patent the output signal U_d of the operational amplifier RV operates a trigger circuit 20 which is so designed that the set value of the rudder angle is approximated by large steps with large course errors and by small steps with small course errors as shown in FIG. 8. The upper curve represents a function of time of the actual course, the lower one a function of time of the rudder angle $d$, the set value of the rudder angle that is approximated by stepwise displacement of the rudder being represented by a dotted line.

In this way the automatic pilot ensures that only a minimum of rudder orders is required. This is true of both the transient state of the control process when the set value of the rudder angle still changes and the steady state of the control process when the set value of the rudder angle only changes scarcely.

FIG. 5 illustrates a preferred embodiment of the trigger circuit 20.

The input 25 of this trigger circuit operating on the output voltage $U_d$ of the operational circuit 18 is connected via a resistor $R_{11}$, to the input of an amplifier $V_1$ and, via a resistor $R_{21}$, to the input of an amplifier $V_2$.

The output of the transmitter is also connected to two rectifiers 28, 29 by leads 26, 27. The transmitter, the rectifiers 28, 29 and the demodulator 13 constitute a unit referred to as the "signal converter" hereinafter having three outputs, to wit a main output connected to the averager and the auxiliary outputs 30 and 31 fed by the rectifiers. The voltage of the output 30 and the positive amount of the course deviation $+|\alpha|$ are in proportion. Accordingly, the poltage of the output 31 and the negative amount of the course deviation $-|\alpha|$ are in proportion.

The output of 30 is connected to the input of trigger circuit 20 and to the input of the amplifier $V_2$ via a resistor $R_{23}$. The output of 31 is connected to the input of the amplifier $V_1$ via a resistor $R_{13}$. Each of the two amplifiers $V_1$ and $V_2$ controls the winding 32, 33 respectively of two relays, each having two normally-open contacts. One contact of the relay operated by the winding 32 establishes through the terminals BB a circuit for a signal operating the steering gear to apply rudder to port, and one contact of the relay operated by the winding 33 establishes through the terminal S$t$B a circuit for supplying a signal operating the steering gear to apply rudder to starboard. The other contacts of each relay when closed carry currents which cause positive feed-back at the inputs of the amplifiers $V_1$ and $V_2$ in accordance with the voltages applied to the leads 30 and 31. For this purpose, the lead 30 is connected, via a resistor $R_{12}$ and one of the contacts of the port relay 32, to the input of the amplifier $V_1$. The lead 31 is connected to the input of the amplifier $V_2$ via a resistor $R_{22}$ and one of the contacts of the starboard relay 33.

Owing to the influence exerted on the inputs of the amplifiers by the voltages $+|\alpha|$ and $-|\alpha|$, the making voltages $U_{de}$ and $U'_{de}$ and the differences $U_{de} - U_{da}$ and $U'_{de} - U'_{da}$ respectively (hereinafter called "hepteresis") between the making voltages and breaking voltages increase with $+|\alpha|$ and $-|\alpha|$, the rudder being actuated by increasingly larger steps. The reciprocal value of the difference between $U_{de}$ and $U'_{de}$ is known as the sensitivity of the trigger circuit. FIGS. 6 and 7 will make this clear. FIG. 6 shows what will happen when the input voltage $U_d$ of the trigger circuit 20 continuously increases from a negative amount to a positive one, with the voltage passing the switch points L, M, N, and O. These switch points in the diagram shown in FIG. 7 represent limits which are formed by the two making voltages and by the two breaking voltages.

When the voltage $U_d$ increases from a considerable negative value to a positive one the following result will be noted: The voltage $U_d$ passes limit L, the relay winding 33 remaining excited. As soon as the voltage $U_d$ has risen to the small negative limit M, the winding 33 is de-energized and the steering gear stopped. It starts turning in the opposite direction when the voltage $U_d$ reaches limit O and, as a result, the relay winding 32 is excited. As the voltage $U_d$ continues to drop the relay 32 will be de-energized when the voltage $U_d$ reaches or passes the low positive limit N. Both relays remain de-energized until such time as the voltage $U_d$ has dropped to the negative limit L. Only then the relay winding 33 is excited and causes the steering engine to move the rudder towards port.

The limits L, M, N, and O assume the positions shown in FIG. 7 when the bias voltages fed by the leads 30 and 31 reach substantial values. Hence, the "making" voltages are defined by the limit values L and O, the "breaking" voltages by the limit values N and M. Displacement of said limits L, M, N, and O makes it possible to energize or de-energipe the steering gear if the course error has a small value as shown in the right-hand part of the curves in FIG. 8. However, so long as the course error is a large one, a considerable change thereof is necessary to operate or stop the steering gear. This will be seen in the left-hand part of the curves shown in FIG. 8.

The minimum "making" voltages L and O and the minimum "breaking" voltages N and M can be adjusted by means of two variable resistors $R_{01}$ and $R_{02}$ (FIG. 5). This adjustment is best be made in such manner that the rudder is prevented from overshooting (hunting) to a position causing the voltage $U_d$ to pass the opposite voltage limit and that the minimum rudder steps have the desired value.

The variable resistor $R_{01}$ is inserted between two terminals 35 and 36. Said terminal 35 is connected, via a resistor 37, to the terminal at the relay end of the resistor $R_{12}$ and to the positive wire of the D.C. supply via a resistor 38. The terminal 36 is connected via a resistor 39 to the ternimal at the relay end of the resistor $R_{22}$ and to the negative wire of the D.C. supply via a resistor 40. The resistor $R_{02}$ is inserted between two terminals 41 and 42. 41 is connected to the terminal at the relay end of the resistor $R_{13}$ via a resistor 43 and to the negative wire of the D.C. supply via a resistor 44. Terminal 42 is connected, via a resistor 45, to the terminal at the relay end of the resistor $R_{23}$ and to the positive wire of the D.C. supply via a resistor 46.

The control of the sensitivity and hysteresis of the trigger circuit has the advantage of achieving a reduction of helm orders without impairing accuracy of control. Rudder changes by coarser and less frequent steps are necessary only in the case of course errors of a major order, such as they occur as consequence of violent disturbances or of course alterations.

Whereas in the above embodiment of the invention the feed-back signal required to produce the I-component of the voltage $U_d$ is delivered by the sensor or transmitter 21 that is coupled to the rudder and charges the capacitor $C_5$, in the alternative embodiments illustrated in FIGS. 9 and 10 the feed-back signal is delivered by a low-pass filter simulating the rudder angle, this filter being connected to a second output of the trigger circuit 20.

Simulation of the rudder angle is possible if the rudder, when being controlled by the trigger circuit 20, is moved at a constant and reproducible angular velocity. For this purpose, the controller can be equipped with an arrangement which enables the behaviour of that part of the control loop represented by the steering gear and the feed-back potentiometer to be simulated approximately. The low-pass filter having a time constant T of great magnitude is a suitable means of achieving this result. If the feed-back signal is replaced by the low-pass output voltage, it is possible to obtain an automatic pilot which operates without the requirement for the actual rudder angle to be fed back and which performs the control functions of proportional-plus-reset-plus-derivative action. The discharging time constant of the simulating low-pass filter governs the I-component in the same way as the hereinabove-mentioned time constant T relating to the embodiment shown in FIG. 4.

FIG. 9 illustrates an embodiment of this automatic pilot with the low-pass filter simulating the rudder angle and replacing the feed-back signal. In order to operate this low-pass filter two additional contacts 51, 52 are required with which the relays having the windings 32 and 33 are equipped. When the relay winding 32 is energized and, as a result, contact 51 closed, a capacitor $C_{31}$ is charged positively via a resistor $R_B$. Energization of the relay winding 33 causes the capacitor to be charged negatively. This is effected via contact 52 and a resistor $R_S$.

The rate of the voltage of the capacitor $C_{31}$ and the rate of change of the rudder angle are proportional. One of the terminals of the capacitor is grounded and the other terminal connected to the resistors $R_B$ and $R_S$ is connected to the summing junction 17 of the operational amplifier RV, FIG. 4, via a resistor $R_{31}$, the resistance of which is very high compared with that of the resistors $R_B$ and $R_S$. Thus, the capacitor $C_{31}$ and resistor $R_{31}$ have taken the place of the capacitor $C_5$ and the resistor $R_7$ referred to in FIG. 4. The discharging time constant $$T = R_{31} \cdot C_{31}$$

is in the order of several minutes. After the discharge of the capacitor $C_{31}$ via the resistor $R_{31}$, the rudder angle applied corresponds to the I-component. To alter the influence of the I-component without affecting the P-component a resistor $R_{46}$, the efficiency of which corresponds to that of the resistor $R_6$ of FIG. 4, can be connected to the capacitor $C_{31}$. In case quick action of the I-component is desired, switch 23 must be actuated as soon as the vehicle is on a straight course. This action will result in an immediate discharge of the capacitor $C_{31}$. The effect is the same as that described in respect of FIG. 4.

FIG. 10 represents another embodiment of the low-pass filter. Whereas the filter is, according to FIG. 9, consists of the capacitor $C_{31}$ and the resistors $R_B$, $R_S$ and $R_{31}$, the filter shown in FIG. 10 consists, as is known, of an operational amplifier 53, fed back by a capacitor $C_{32}$, and a resistor $R_{42}$ that is connected in parallel to the capacitor, the time constant being $$T = R_{42} \cdot C_{32}$$

The rate at which the voltage of the capacitor $R_{42}$ rises is determined by the resistors $R_B$ and $R_S$. When the push button 23 (FIG. 10) is pressed, its contacts $S_2$ are closed and connect the output of the operational amplifier 53 associated with the low-pass filter to its summing junction 54, while at the same time the contacts $S_3$ are broken thereby interrupting the signals actuating the steering gear 22.

When used in conjunction with steering gears in which the rate of rudder movement can be controlled by a steady electrical signal acting upon the steering gear, an embodiment of the present invention may be employed with advantage. In this embodiment there is provided, instead of a trigger circuit, an amplifier whose output is, as well-known in servo loops, matched to the electrical input of the steering gear, for example, by a servo-valve. Since this enables the computed rudder angle to be attained accurately, this embodiment has the advantage of achieving an even higher degree of control accuracy, and hence improved maintenance of the course. The embodiment is particularly suitable for very fast ships or aircraft.

The advantages of the invention as here outlined are best realized when all of its features and instrumentalities are combined in one and the same apparatus, but useful results may be produced by apparatus embodying less than the whole.

It will be obvious to those skilled in the art to which the invention appertains that the same may be incorporated in several different constructions. The accompanying drawing, therefore, is submitted merely as showing the preferred exemplifications of the invention.

For the purpose of facilitating an understanding of the claims following hereinafter it will now be shown how the terms used in the claims apply to the examples described. As shown in FIG. 1 the automatic pilot comprises a direction indicator 11, an adjustable course-selector, a signal converter 12, an electrically controlled motor-operable steering gear 22 and electrical connecting means 16, 18, 20 which connect the signal converter 12 with the steering gear 22. The connecting means 16–20 include averaging means 16, an operational circuit 18 and a trigger circuit 20. The averaging means include an electrical circuit formed by the voltage source U, the resistors $R_2$ and $R'_2$ and the rectifiers D, D'. This electrical circuit constitutes the dead zone referred to hereinabove. The electrical circuit includes the rectifiers D, D' which are connected with the input 15 of the averaging means and serve the purpose of permitting the limits of the dead zone to be altered as described hereinabove with reference to FIG. 2.

The operational circuit 18 as shown in FIG. 4 or 11 has the input 19 connected to the output of the averaging means shown in FIG. 2. Moreover, it has an output co-operatively connected by means of the trigger circuit 20 to the steering gear. The operational circuit 18 includes circuit means containing the elements $C_4$, $R_4$, $C_5$, $R_7$ and amplifier RV for producing the output voltage which causes the rudder angle to be composed of the three components described hereinabove.

The trigger circuit 20 as shown in FIG. 5 is inserted between the output of the operational circuit 18 and the steering gear 22, as will appear from FIG. 1. This trigger circuit has a main input 25 and two auxiliary inputs 30 and 31 and includes variable means having a sensitivity and a hysteresis which are adjusted in response to the signals applied to the auxiliary inputs 30 and 31 from the signal converter 12.

The circuit means shown in FIG. 4 included in the operational circuit 18 for producing an output voltage having a component proportional to the integral includes means, such as condenser $C_5$, which is connected to the sensor or transmitter 21. This sensor or transmitter constitutes electrical means for producing a feed-back signal. These electrical means may be formed by the sensor or transmitter 21 connected to the rudder or by the simulating circuit shown in FIG. 9 in which the condenser 31 is charged with a voltage which changes in a similar manner as the rudder angle.

What I claim is:

1. Electrical automatic pilot for rudder-controlled vehicles comprising a direction indicator, an adjustable course-selector, a signal converter connected with said direction indicator and with said course selector for producing
   (1) an electrical error signal representing the course error,
   (2) an auxiliary signal proportional to the positive amount of said error signal, and
   (3) a second auxiliary signal proportional to the negative amount of said error signal,
an electrically controlled motor-operable steering gear for actuating the rudder of the vehicle, and electrical connecting means connecting said signal converter with said steering gear, said connecting means including
   (a) averaging means having an input and an output, said input being connected to said signal converter to receive said signal therefrom, said averaging means including an electrical circuit which constitutes a dead zone with adjustable voltage limits for producing, and feeding to said output, an output signal representative of the mean value ($\alpha_m$) of said voltage limits and includes means connected with said input for altering said limits by said voltage signal analogously to a mechanical backlash,
   (b) an operational circuit having an input connected to said averaging means and an output cooperatively connected to said steering gear, said operational circuit including circuit means for producing an output voltage causing said steering gear to produce an instantaneous rudder angle composed of three components, the first one of said components being proportional to said output signal ($\alpha_m$), the second component being proportional to the integral of said output signal ($\alpha_m$) and the third component being proportional to the differential quotient of said output signal ($\alpha_m$), and (c) a trigger circuit inserted in the cooperative connection between said output of said operational circuit and said steering gear and having steering switches connected with said steering gear and having a main input and two auxiliary inputs, said trigger circuit further including variable means controlling the sensitivity and hysteresis of said trigger circuit and being connected to said auxiliary inputs, said auxiliary inputs being connected to said signal converter to receive said auxiliary signals therefrom, whereby said sensitivity and hysteresis are adjusted proportional to said auxiliary signals, electrical means for producing a feed-back signal, said circuit means including means connected to said electrical means to receive said feedback signal therefrom for rendering said second component proportional to the integral of said output signal ($\alpha_m$).

2. An automatic pilot as claimed in claim 1 in which said electrical means is formed by a feedback signal transmiter cooperatively connected to said motor-operable steering gear to produce a feedback signal depending on said rudder angle.

3. An automatic pilot as claimed in claim 1 in which said electrical means is formed by a network for approximately simulating the rudder angle, said network having an input connected to said trigger circuit and an output connected to said circuit means.

4. Electrical automatic pilot for rudder-controlled vehicles comprising a direction indicator, an adjustable course-selector, a signal converter connected with said direction indicator and with said course selector for producing an electrical D.C. voltage signal representing the course error, an electrically controlled motor-operable steering gear for actuating the rudder of the vehicle, and electrical connecting means connecting said signal converter with said steering gear, said connecting means including (a) averaging means having an input and an output, said input being connected to said signal converter to receive said D.C. voltage signal therefrom, said averaging means including an electrical circuit which constitutes a dead zone with adjustable voltage limits for producing, and feeding to said output, an output signal representative of the mean value ($\alpha_m$) of said voltage limits and includes means connected with said input for altering said limits by said D.C. voltage signal analogously to a mechanical backlash, (b) an operational circuit having an input connected to said output of said averaging means and an output co-operatively connected to said steering gear, said operational circuit including circuit means for producing an output voltage causing said steering gear to produce an instantaneous rudder angle composed of three components, the first one of said components being proportional to said output signal ($\alpha_m$), the second component being proportional to the integral of said output signal ($\alpha_m$) and the third component being proportional to the differential quotient of said output signal ($\alpha_m$), and (c) a servo amplifier having an input and an output, said input being connected to said output of said operational circuit and said output of said servo amplifier being connected to said controller for moving the rudder at an angular velocity proportional to the output signal of said servo amplifier, a feed-back signal transmitter being co-operatively connected to said motor-operable steering gear to produce a feed-back signal depending on said rudder angle, said circuit means including a capacitor connected to said feed-back signal transmitter to receive the feed-back signal therefrom for producing said second component proportional to the integral of said output signal ($\alpha_m$).

5. An automatic pilot as claimed in claim 1 in which said electrical circuit included in said averaging means comprises a voltage divider having a pair of end terminals and a central tapping point, a grounded capacitor connected to said tapping point and to said output of said averaging means, and a voltage source connected between said end terminals, said means connected with said input for altering said limits comprising a pair of rectifying diodes each connected between one of said end terminals and said input of said averaging means.

6. An automatic pilot as claimed in claim 4 in which said electrical circuit included in said averaging means comprises a voltage divider having a pair of end terminals and a central tapping point, a grounded capacitor connected to said tapping point and to said output of said averaging means, and a voltage source connected between said end terminals, said means connected with said input for altering said limits comprising a pair of rectifying diodes each connected between one of said end terminals and said input of said averaging means.

7. An automatic pilot as claimed in claim 5 further comprising at least one low-pass filter included in said connecting means adjacent to said averaging means.

8. An automatic pilot as claimed in claim 6 further comprising at least one low-pass filter included in said connecting means adjacent to said averaging means.

9. An automatic pilot as claimed in claim 7 in which said voltage source and the time constant of said low-pass filter are adjustable, the automatic pilot further comprising a control knob connected with both said voltage source and said low-pass filter for simultaneously adjusting the same.

10. An automatic pilot as claimed in claim 8 in which said voltage source and the time constant of said low-pass filter are adjustable, the automatic pilot further comprising a control knob connected with both said voltage source and said low-pass filter for simultaneously adjusting the same.

11. An automatic pilot as claimed in claim 1 in which said circuit means included in said operational circuit comprises an operational amplifier having a summing junction, a resistor and a first capacitor connected in shunt with each other being inserted between said input of said operational circuit and said summing junction for causing said first one and said third one of said components to be produced, a second capacitor connected to said electrical means for producing said feed-back signal, a resistor connected to said second capacitor for decreasing its potential very slowly, and a resistor connected with said second capacitor for producing said second component.

12. An automatic pilot as claimed in claim 4 in which said circuit means included in said operational circuit comprises an operational amplifier having a summing junction, a resistor and a first capacitor connected in shunt with each other being inserted between said input of said operational circuit and said summing junction for causing said first one and said third one of said components to be produced, a second capacitor connected to said electrical means for producing said feed-back signal, a resistor connected to said second capacitor for decreasing its potential very slowly, and a resistor connected with said second capacitor for producing said second component.

13. An automatic pilot as claimed in claim 11 in which said feed-back means is cooperatively connected with said rudder to be adjusted in response to the rudder angle for producing a feed-back signal depending on said rudder angle.

14. An automatic pilot as claimed in claim 12 in which said feed-back means is cooperatively connected with said rudder to be adjusted in response to the rudder angle for producing a feed-back signal depending on said rudder angle.

15. An automatic pilot as claimed in claim 11 in which said trigger circuit has a second output, said feed-back means including a low-pass filter connected to said second output for approximately simulating the rudder angle.

16. An automatic pilot as claimed in claim 12 in which said trigger circuit has a second output, said feed-back means including a low-pass filter connected to said second output for approximately the rudder angle.

17. An automatic pilot as claimed in claim 13 further comprising signal-control means co-operatively connected with said signal converter and with said second capacitor for automatically shortcircuiting the latter, when said course error exceeds a certain limit and for automatically restoring said second capacitor to operative condition, when the course error decreases below said limit.

18. An automatic pilot as claimed in claim 17 in which said integral-control means comprises a switch shunted across said second capacitor for shortcircuiting same and means for controlling said switch in response to the course error.

19. An automatic pilot as claimed in claim 15 in which said low-pass filter includes a second operational amplifier provided with a feed-back circuit, a capacitor and a resistor connected in shunt with each other representing said feed-back circuit, the input of said second operational amplifier being connected to said second output of said trigger circuit.

20. An automatic pilot as claimed in claim 11 in which said second capacitor has a terminal connected to said operational amplifier, said automatic pilot further comprising a hand switch for simultaneously grounding said terminal and for interrupting said connecting means between said operational circuit and said trigger circuit to thereby interrupt the signals conveyed to said steering gear.

21. An automatic pilot as claimed in claim 19 in which said second operational amplifier has a summing junction, said pilot further comprising a switch means for simultaneously connecting the output of said second operational amplifier with its summing junction and interrupting said connecting means between said operational circuit and said trigger circuit to thereby interrupt the signals conveyed to said steering gear, while the output of said second operational amplifier is connected with its summing junction.

22. An automatic pilot as claimed in claim 1 in which said signal converter has two auxiliary outputs for delivering said auxiliary voltages, said auxiliary outputs being connected to said auxiliary inputs of said trigger circuit respectively, said trigger circuit being settable to a selected one of three operative states at any time, said variable means effecting the selection of said one state depending on the passage of said output voltage of said operational circuit through one of four limits formed by two making voltages and by two breaking voltages of said steering switches, said limits being spaced apart by values corresponding substantially to the magnitudes of said auxiliary voltages, whereby the making voltages of said steering switches and the differences between said making voltages and said breaking voltages will increase with increasing course error.

23. An automatic pilot as claimed in claim 22 in which said variable means of said trigger circuit comprises two amplifiers and a pair of relays having normally open contacts, each relay being connected to the output of one of said amplifiers, the input of each of said amplifiers being connected to the output of said operational circuit and being furthermore connected by cross-coupling to said auxiliary outputs of said signal converter to thereby cause the auxiliary signals of said signal converter to bias the amplifier inputs and to cause positive feed-back to be provided to the inputs of said amplifiers via said normally open contacts of said relays.

References Cited

UNITED STATES PATENTS

| | | |
|---|---|---|
| 2,159,142 | 5/1939 | Fischer. |
| 2,704,644 | 3/1955 | Good et al. |
| 2,853,671 | 9/1958 | Lewis et al. |
| 3,052,831 | 9/1962 | Lewis et al. |
| 3,140,843 | 7/1964 | Pettit. |

BENJAMIN DOBECK, Primary Examiner

U.S. Cl. X.R.

244—77; 318—489

UNITED STATES PATENT OFFICE
CERTIFICATE OF CORRECTION

Patent No. 3,517,285Dated June 23, 1970

Inventor(s) Walter Kundler

It is certified that error appears in the above-identified patent and that said Letters Patent are hereby corrected as shown below:

In the drawings, sheet 2, Fig. 7, "BB EIN" should be -- PORT ON --; "AUS" should be -- OFF --; and "StB EIN" should be -- STBD ON --. Column 2, line 45, cancel "the"; and cancel "referred to hereinbefore" and substitute -- in accordance with the teachings of the invention --. Column 9, line 4, cancel "the", first occurrence; and cancel "of", second occurrence, and substitute -- charge across --; and in line 29 cancel "is". Column 10, line 39, after "condenser" insert -- C --.

Signed and sealed this 13th day of July 1971.

(SEAL)
Attest:

EDWARD M. FLETCHER, JR.WILLIAM E. SCHUYLER, JR.
Attesting OfficerCommissioner of Patents